United States Patent
Chang

(10) Patent No.: US 7,774,192 B2
(45) Date of Patent: Aug. 10, 2010

(54) METHOD FOR EXTRACTING TRANSLATIONS FROM TRANSLATED TEXTS USING PUNCTUATION-BASED SUB-SENTENTIAL ALIGNMENT

(75) Inventor: Jason S. Chang, Hsin-Chu (TW)

(73) Assignee: Industrial Technology Research Institute, Hsin Chu (TW)

( * ) Notice: Subject to any disclaimer, the term of this patent is extended or adjusted under 35 U.S.C. 154(b) by 1267 days.

(21) Appl. No.: 11/026,134

(22) Filed: Jan. 3, 2005

(65) Prior Publication Data

US 2006/0150069 A1 Jul. 6, 2006

(51) Int. Cl.
G06F 17/28 (2006.01)
(52) U.S. Cl. .................................... 704/2; 704/4; 704/6
(58) Field of Classification Search .................... 704/6, 704/4
See application file for complete search history.

(56) References Cited

U.S. PATENT DOCUMENTS

| | | | | |
|---|---|---|---|---|
| 4,964,030 A * | 10/1990 | Suzuki et al. | .................. | 704/6 |
| 5,088,039 A * | 2/1992 | Kugimiya et al. | .............. | 704/4 |
| RE35,464 E * | 2/1997 | Suzuki et al. | ................. | 704/2 |
| 5,867,811 A * | 2/1999 | O'Donoghue | .................. | 704/1 |
| 6,092,034 A * | 7/2000 | McCarley et al. | ............. | 704/2 |
| 6,182,026 B1 * | 1/2001 | Tillmann et al. | ............... | 704/2 |
| 2002/0107683 A1 * | 8/2002 | Eisele | ........................... | 704/2 |
| 2003/0093262 A1 * | 5/2003 | Sanchez Gomez | ............ | 704/4 |
| 2006/0106870 A1 * | 5/2006 | Franaszek et al. | ........ | 707/104.1 |
| 2006/0150069 A1 * | 7/2006 | Chang | ..................... | 715/500.1 |
| 2007/0010989 A1 * | 1/2007 | Faruquie et al. | ................ | 704/2 |

OTHER PUBLICATIONS

Brown, P. F., Lai, J. C., and Mercer, R. L. 1991. Aligning sentences in parallel corpora. In Proceedings of the 29th Annual Meeting on Association for Computational Linguistics (Berkeley, California, Jun. 18-21, 1991). Annual Meeting of the ACL. Association for Computational Linguistics, Morristown, NJ, 169-176.*

(Continued)

*Primary Examiner*—Talivaldis I Smits
*Assistant Examiner*—Michael Ortiz Sanchez
(74) *Attorney, Agent, or Firm*—Finnegan, Henderson, Farabow, Garrett & Dunner, LLP

(57) ABSTRACT

A method for text alignment of a first document and a second document that is a translation version of the first document. The method first divides paragraphs of the first and second documents into sub-sentential segments according to the punctuations in the language of the first and second documents. Each of sub-sentential segments corresponds to a plurality of words. After the sub-sentential segmenting process, pairs of alignment units are summarized from the first and second documents. The alignment units in the first and second documents are then aligned and scored mainly based on the probability of corresponding punctuations. To increase the alignment accuracy, the pairs of alignment units can also be aligned and scored based on at least one of length corresponding probability, match type probability, and lexical information. The method allows for fast, reliable, and robust alignment of document and translated document in two disparate languages.

19 Claims, 2 Drawing Sheets

OTHER PUBLICATIONS

Melamed, I. D. 1997. A portable algorithm for mapping bitext correspondence. In Proceedings of the 35th Annual Meeting of the Association for Computational Linguistics and Eighth Conference of the European Chapter of the Association for Computational Linguistics (Madrid, Spain, Jul. 7-12, 1997). Annual Meeting of the ACL. Association for Computa.*

Chen, S. F. 1993. Aligning sentences in bilingual corpora using lexical information. In Proceedings of the 31st Annual Meeting on Association for Computational Linguistics (Columbus, Ohio, Jun. 22-26, 1993). Annual Meeting of the ACL. Association for Computational Linguistics, Morristown, NJ, 9-16.*

Simard, M., Foster, G. F., and Isabelle, P. 1993. Using cognates to align sentences in bilingual corpora. In Proceedings of the 1993 Conference of the Centre for Advanced Studies on Collaborative Research: Distributed Computing—vol. 2 (Toronto, Ontario, Canada, Oct. 24-28, 1993). A. Gawman, E. Kidd, and P. Larson, Eds. IBM Centre for Advan.*

Kay, M. and Röscheisen, M. 1993. Text-translation alignment. Comput. Linguist. 19, 1 (Mar. 1993), 121-142.*

Somers, H. (1999). Knowledge Extraction from Bilingual Corpora, in M. T. Pazienza (ed.), Information Extraction: Towards Scalable, Adaptable Systems, vol. 1714 of Lecture Notes in Artificial Intelligence, Springer, pp. 95-119. 2nd School on Information Extraction, SCIE-99. Frascati, Italy, Jun. 28-Jul. 2, 1999.*

Chuang, T., G.N. You and J.S. Chang (2002), "Adaptive Bilingual Sentence Alignment," Lecture Notes in Artificial Intelligence 2499, pp. 21-30.*

Chuang, Thomas C., and Jason S Chang, 2002. Adaptive Sentence Alignment based on Length and Lexical Information, in Proceedings of the 40th Annual Meeting of Association for Computational Linguistics, Comp. vol. 91-92.*

Chuang, Thomas C., Jian-Cheng Wu, Tracy Lin, Web-Chie Shei and Jason S. Chang, "Bilingual Sentence Alignment Based on Punctuation Statistics and Lexicon," Proceedings of the first International Joint Conference on Natural Language, IJCNLP-04, pp. 644-651, Hainan Island, China, Jan. 2004.*

Wen-Chi Hsien; "Using Punctuations and Lengths for Bilingual Subsentential Alignment"; Master's Degree Thesis; Tsing Hua University; Jan. 2004.

William A. Gale et al.; "A Program for Aligning Sentences in Bilingual Corpora"; AT&T Bell Laboratories; 16 pages & Appendix, 1991.

Chunyu Kit et al.; Clause Alignment for Hong Kong Legal Texts: A Lexical-based Approach; Department of Chinese, Translation and Linguistics; City University of Hong Kong; 15 pp, 2004.

* cited by examiner

METHOD FOR EXTRACTING TRANSLATIONS FROM TRANSLATED TEXTS USING PUNCTUATION-BASED SUB-SENTENTIAL ALIGNMENT

BACKGROUND

1. Field of the Invention

The present invention relates generally to a method of extracting translations from translated texts, and more particularly, to a method of extracting translations from translated texts using sub-sentential alignment based on punctuations.

2. Background of the Invention

In an environment in which a source document and a translated document of the source document are compared, a number of applications may require alignment of sentences in the source document with those in the translated document. Examples of the applications include machine translation, computer-assisted language learning, and computer-assisted translation. Alignment on a sentence level is known to be useful for the extraction of bilingual and multilingual lexical and terminological information from existing bilingual and multilingual documents. As such, the ability to align sentences of the source and translated documents is important.

A number of sentence alignment techniques are known in the art, all of which focus on the sentence length or the lexical information of the documents. Under one sentence alignment technique, alignment is based on the length of the sentence, and the other available information is ignored. Therefore, the algorithm to implement this sentence alignment technique is simple and straightforward, and is adequate for two languages having similar characteristics (such as English and French). However, for two languages having very different characteristics, such as English and Chinese, the accuracy of sentence alignment is greatly decreased. Furthermore, the sentence alignment technique utilizes a relative simple dynamic programming technique. That is, the required memory capacity is dependent upon the length of the documents to be compared. Thus, the larger the pair of documents, the lesser the processing efficiency.

Another sentence alignment approach utilizes lexical information to compensate for the disadvantages of the aforementioned length-based approach. In it, individual sentences are split into words and the lexical information is extracted from the sentences to be aligned. To compensate for its reliability, this approach must rely heavily on external sources, such as dictionaries, to assure the accuracy of the translation. Therefore it is time-consuming. Accordingly, the efficiency of this approach is considerably lower.

BRIEF SUMMARY OF THE INVENTION

An object of the present invention is to provide a sentence alignment method that employs length-based and punctuation-based approaches to align a translated document and its source document.

In accordance with one preferred embodiment of the present invention, a method of text alignment of a first document and a second document that is a translation version of the first document is provided. The method accesses a first text of the first document and a second text of the second document, wherein the first and second texts include at least one paragraph, and divides the first text and second text into sub-sentential segments, wherein each of the sub-sentential segments is considered as a list of words and the length of each sub-sentential segments is the number of words contained therein. The method further obtains pairs of alignment units from the first text and the second text after the sub-sentential segmentation processing, wherein each of the alignment units includes at least one sub-sentential segment; and aligns and scores the pairs of alignment units.

In the preferred embodiment, the method aligns and scores the pairs of alignment units based on the probability of corresponding punctuations. In addition, the method can further refer at least one of length corresponding probability, match type probability and lexical information.

Another preferred embodiment of the present invention discloses a process for text-aligning a first document and a second document that is a translation version of the first document. The process comprises dividing paragraphs of the first and the second documents into a number of sub-sentential segments, combining shorter sub-sentential segments in the paragraphs according a predetermined minimum length and a predetermined rule, and generating pairs of alignment units after the combination from the first and second documents, wherein each of the alignment units includes at least one sub-sentential segment and has a length equal to the number of sub-sentential segments contained therein. For a better text-alignment result, the process pre-processes a portion of the pairs of alignment units to obtain reference components. The reference components are then used during subsequent aligning and scoring process.

In accordance with the present invention, a system for text alignment of a first document and a second document that is a translation version of the first document is also provided. The system includes a memory for receiving the first and the second documents, a pre-processor, and a processor. The pre-processor divides paragraphs of the first and the second documents into a number of sub-sentential segments, combines shorter sub-sentential segments in the paragraphs according to a predetermined minimum length and a predetermined rule, generates pairs of alignment units from the first and second documents, wherein each of the alignment unit includes at least one sub-sentential segments and has a length equal to the number of sub-sentential segments included in the alignment unit, and pre-processes a portion of the pairs of alignment units to obtain reference components. Afterward, a processor is used for aligning and scoring the pairs of alignment units according to the reference components obtained by the pre-processor.

DETAILED DESCRIPTION OF THE INVENTION

Figure 1:
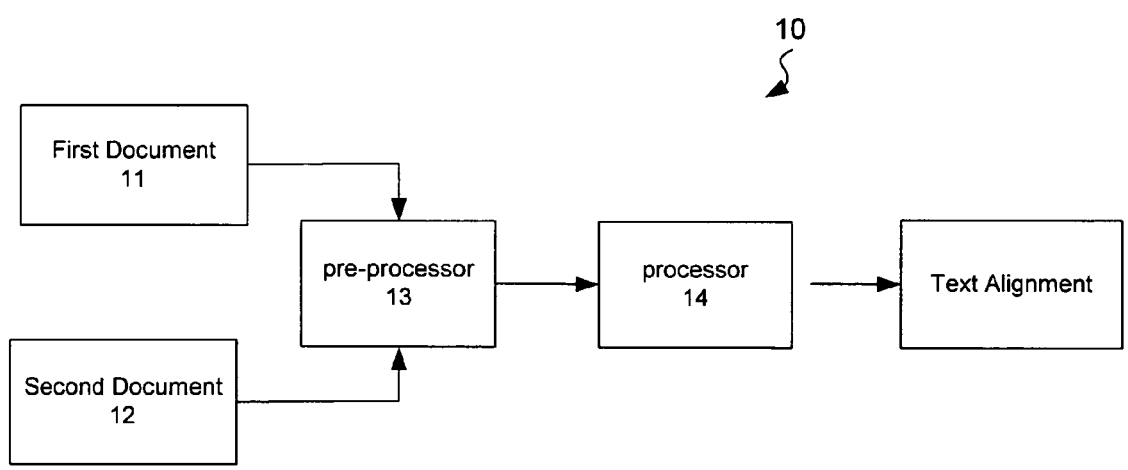
FIG. 1 shows an exemplary system in accordance with the present invention.

A preferred embodiment of the present invention focuses on increasing the efficiency of aligning sentences of a first document and a second document that is translated from the first document. The languages of the first and second documents have very different language characteristics. In one embodiment, the languages are English and Chinese.

The method of the present invention combines both length-based and punctuation-based approach to alignment. The method of the present invention includes tokenization that divides a sentence into a plurality of units, or tokens. Tokenization is a known process and will not be described further herein. The method also includes dividing paragraphs into a plurality of sub-sentential segments. A step of determining the segment length follows. The segment length cannot be too small or else it cannot be accurately relied upon. If it is too small, the segment is combined with the previous segment. Generally, a minimum segment length may optionally be set.

The method of the present invention continues with a step of normalization that considers multi-word units (multi-tokens) as single unit (token) that takes into consideration the length and syntax structures of the segments. Again, normalization is known in the art and will not be discussed further herein. Finally, a step of dynamic programming is performed. This conventional step provides special consideration to punctuations, and may also consider length and lexicon information.

Generally, when aligning two documents written in two languages with very different characteristics, it needs to carefully consider their language structures for a good alignment result. In the example of Chinese and English, the languages use different punctuations. In Chinese, a "，" (comma) is generally used to connect two relevant sentences that corresponds to the comma punctuation "," in English, and "。" (period) at the end of a sentence instead of "." in English. Furthermore, in Chinese, punctuations 「and」are used to quote the words spoken by a person. But in English, the quotation marks " " are used to quote the words spoken by a person. Moreover, in Chinese, punctuation "、"is used to connect more than two nouns, actions, and/or verbs, but English simply uses "," to accomplish this function.

In addition to the punctuations, Chinese sometimes uses more than one character to represent a meaning or a word. As an example of translating English into Chinese, "worker" can be translated into "勞工"in Chinese, which composes of two Chinese characters, or "exhausted" can be translated into "累壞了",which composes three Chinese characters. In this case, an English document may have a shorter length than a translated Chinese document. Furthermore, Chinese and English have different language structures. For example, Chinese tends to put "time" before "event" but English always put "time" after "event." Furthermore, the Chinese language does not have past tense or future tense. Therefore, an English sentence such as "I went to a movie yesterday" may be translated to Chinese in the following order "Yesterday I go to a movie." Therefore, when using the length-based sentence alignment technique to align a pair of English and Chinese documents, chances are that it needs enormous calculations to correctly align these documents or greatly relies on dictionaries to seek explanations. As a result, the efficiency of text alignment between English and Chinese documents is reduced.

Therefore, a preferred embodiment of the present invention considers factors including the length and punctuations between two languages to improve the efficiency of text alignment of a first document and a second document translated from the first document.

FIG. 1 illustrates a basic structure of an exemplary system 10 for text alignment in accordance with the present invention. As shown, first document 11 (for example, a Chinese document) and second document 12 (for example, an English document) are input into processor 14 for text alignment. Second document 12 is a translated version of first document 11. In accordance with the present invention, to increase the efficiency, before inputting to processor 14, first 11 and second 12 documents can be coupled to pre-processor 13, where portions of these documents are sampled for a text alignment for the purpose of training to obtain reference components. The reference components obtained from the training process are then fedback to and referenced by processor 14 for segment alignment to optimize the final alignment result.

Figure 2:
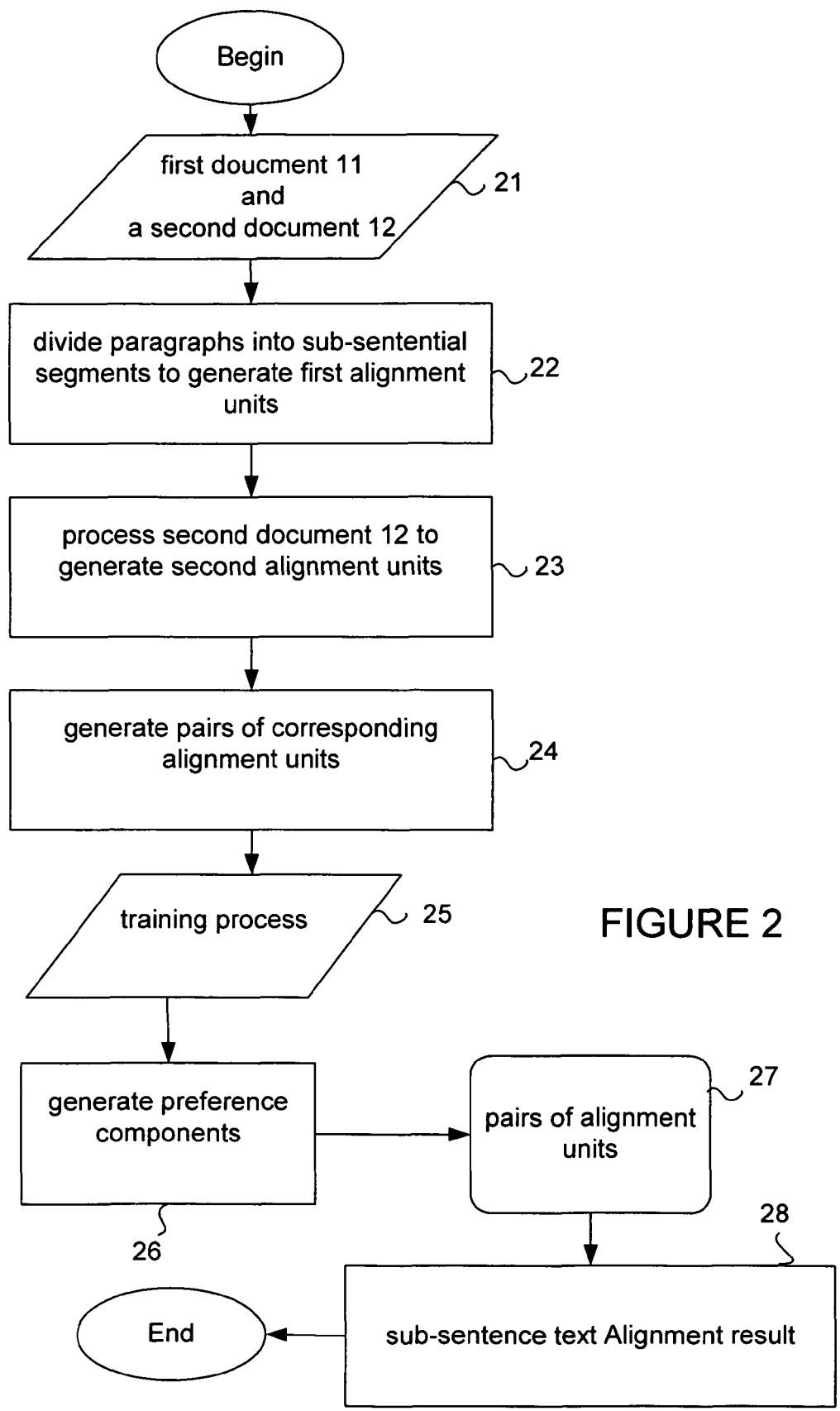
FIG. 2 is a flow diagram of a method consistent with one embodiment of the present invention.

A training process in accordance with the present invention is illustrated in the process of FIG. 2. In FIG. 2, at step 21, first document 11 and second document 12 are provided. As mentioned above, Chinese is a language that has a very different characteristic from English and sometimes a Chinese document includes more characters than an English document translated from the same Chinese document. For the purpose of explanation, the followings are samples of a first document written in Chinese and a second document written in English.

First document 11:

打鼓原是我最喜歡的，後來卻變成邊打邊睡，一個月六萬元的死工作。

Second document 12:

Drumming was at first the thing I loved most, but later it began half drumming, half sleeping, just a job for NT $60,000 a month.

From the above example, originally, first document 11 has 28 Chinese characters and three punctuations including two "，" and one "。" (period). Second document has 25 words (or 25 units) and four punctuations including three "," and one "." (period). Conventionally, the length of first document 11 would be considered as "28," i.e., the number of the Chinese characters, and that of second document 12 as "25," i.e., the number of the English words. In accordance with the present invention, however, the Chinese document is further processed to define "word" that can be composed of one or more than one characters. This is tokenization.

At step 22, Chinese document (i.e., first document 11) is processed to divide each paragraph into sub-sentential segments. Each of the sub-sentential segments is considered as a "unit" or a "word." Therefore, the text of first document 11 becomes the following.

打鼓/原/是/我/最/喜歡/的，後來/卻/變成/邊/打/邊/睡/，/一個月/六萬/元/的/死/工作。

As a result, first document 11 now contains 21 "units" or "words". Afterward, a Chinese paragraph module comprising a number of sub-sentential segments is generated at step 23.

At step 24, the English document (i.e., second document 12) is also accessed and processed. In accordance with the present invention, as every English word is separated by a space, it is easy to divide the English document based on the space between words. However, as English includes phrases in its structure, for example, "at first", "as a result", "in fact" and so on, which actually represent only one meaning although they are composed of more than one words. In this case, these phrases are considered as a "word" or "unit" for alignment. In the above example, after processing, second document 12 still contains 24 "words" or "units."

In accordance with the present invention, multiple "words" or "units" form an alignment unit, which normally includes at least one sub-sentential segment. Here, a "sub-sentential segment" is defined by a text that starts after a first punctuation and ends by a second punctuation. The length of the alignment unit is the number of "words" or "units" included in the alignment unit. According to the present invention, it is not essential to combine an alignment unit based on every punctuation. Preferably, punctuations such as . ! ? ; : , -- . . . in English and 。，；：？！. . . - - - in Chinese are considered in composing alignment units.

At step 24, after the processing of first 11 and second 12 documents according to the above rules, pairs of texts of first and second documents are thus obtained for further alignment.

Preferably, as shorter sub-sentential segments make the alignment result less accurately, steps 22-24 of FIG. 2 combine sub-sentential segments when at least one of the subsentential segments is too short in length. The length of the combined sub-sentential segments, however, cannot be too long, either. Otherwise, the alignment technique used in the present invention would be no difference from the conventional sentence alignment. Accordingly, it is necessary to measure the length of each sub-sentential segment and set up a minimum length of a sub-sentential segment that does not need to be combined with other segments. An example is as shown below:

Second document: [Mr. President, in 1998 when the government was prepared to set up the Whitehead Detention Center in Ma On Shan], where the text included in [ ] is an alignment unit.

First document:
〔主席先生， 在一九八八年〕，〔當政府準備在沙田馬鞍山興建白石船艇留中心的時候〕

In the above example, two sub-sentential segments 主席先生 and 在一九八八年 are combined as an alignment unit as both of the sub-sentential segments have lengths less than a predetermined minimum length, in which the length of sub-sentential segment 主席/先生 is 2 and that of 在/一九八八/年 is 3. In accordance with a preferred embodiment of the present invention, the basic combination rules are (1) for a sub-sentential segment that ends with a "," it is combined with the next sub-sentential segment; otherwise, (2) short sub-sentential segment is combined with its preceding sub-sentential segment. The minimum length of each sub-sentential segment is determined in a training process that is carried out before the sub-sentential alignment. A user according to specific application requirements may set the minimum length.

To increase the accuracy of the text alignment, a preferred embodiment of the present invention pre-processes several paragraphs of the texts of first 11 and second 12 documents before these two documents are under an intensive and dynamic calculation. The pre-process is also called "training process," which is illustrated at step 25 of FIG. 2.

At step 25, only a portion of the texts of first 11 and second 12 documents are extracted for pre-processing. The pre-processing is similar to steps 22-24, wherein paragraphs of the trained texts of first 11 and 12 documents are divided into sub-sentential segments so that a pair of texts is obtained for a future alignment. In this step, the pair of texts is input to a pre-processor (such as a pre-processor 13 of FIG. 1) for alignment. As the information gathered at this step is raw and is not yet adjusted, there are many errors occurred in this pre-processing step. Therefore, the raw alignment results are first taken to a person to correct the errors and to generate training information.

At step 26, the training information is then input to a software program for analysis and processing. After the analysis and processing, the software program concludes and outputs preferred reference components and feedbacks these reference components to a host system. The reference components may include at least one of length expectation values of Chinese and English sentences, variants, probability of corresponding punctuations, probability of deletion score of the punctuations, probability of matched type and so on. After being fedback to the host system, such as system 10 of FIG. 1, system 10 then relies on the reference components to determine the alignment score of the texts of two documents to be aligned.

According to experiments, the probability of corresponding punctuations between English and Chinese is as shown in the following Table I.

TABLE I

| English Punctuations | Chinese Punctuations | Probability |
| --- | --- | --- |
| , | ， | 0.26 |
| , | 、 | 0.006 |
| , | 。 | 0.001 |
| , | ； | 0.001 |

After the training steps as shown at steps 25 and 26, the process of FIG. 2 next text-aligns, at step 27, the pairs of alignment units of first 11 and second 12 documents obtained at step 24. As described above, the preferred embodiment not only employs length-based alignment technique (but in the present invention, the length is calculated by the number of "words" or "tokens" of an alignment unit), but also considers punctuation-based alignment and other components such as probabilities of detection score, matched typed, and so on. If necessary, the text alignment according to the present invention can also consider lexical information such as the translations in external bilingual dictionaries to increase the accuracy of the text alignment. Preferably, the text alignment method can only rely on punctuation-based alignment technique. Preferably, the text alignments of step 27 are processed dynamically, based on alignment scores calculated from the process.

According to the present invention, the probability of a pair of alignment units is calculated in length base or punctuation base by the following equation:

$$P(A \mid E, C) = P(l_1^t \mid E, C) = \prod_{k=1}^{t} P(l_k \mid E, C)$$

wherein E is an English paragraph, C is a Chinese paragraph, and l represents a linking manner of all sub-sentential segments included in the pair of alignment unit.

The probability of each possible linking probability l can be calculated by multiplying the probability of corresponding punctuations, corresponding length probability and corresponding lexical information probability. The module of probability of corresponding punctuations is defined below:

$$P_{pun}(e_i, c_j) = P_{match}(p_{ei}, p_{cj}) P_{del}(P_{ei}) P_{del}(P_{cj}), \text{ for some } l_k = (e_i, c_j)$$

where $e_i$ and $c_j$ have one or many punctuations;

$e_i$, $c_j$=English and Chinese text-alignment units;

$p_{ei}$=the English punctuations of $e_i$, i=1, m;

$p_{cj}$=the Chinese punctuations of $c_j$, j=1, n;

$P_{match}(P_{ei}, P_{cj})$=probability of ending punctuation of $e_i$ translates into ending punctuation of $c_j$;

$P_{del}(P_{ei})$=probability of punctuations in $e_i$ (not contain ending punctuation) to be deleted; and $P_{del}(P_{cj})$=probability of punctuations in $c_j$ (not contain ending punctuation) to be deleted.

The probability of corresponding lengths is defined as:

$$P(E,C)=\text{Prob}(\delta|\text{match})\text{Prob}(\text{match})$$

wherein $\text{Prob}(\delta|\text{match})=2(1-\text{Prob}(|\delta|))$ $$Prob(\delta) = \frac{1}{\sqrt{2\pi}} \int_{-\infty}^{\delta} e^{-z^2/2} dz.$$

and Prob(match) is the probability of match type of the sub-sentential segments included in the pair of alignment unit.

Therefore, the probability module can be represented as follow:

$$P(A \mid E, C) = \prod_{k=1}^{t} P(l_k \mid E, C) = \prod_{k=1}^{t} P(\delta_k \mid match_k) P(match_k) P_{pun}(e_{ik}, c_{jk}).$$

Furthermore, the text alignment technique of the present invention can also refer lexical information of the aligned documents. The probability of lexical information that can be used in the text alignment of the present invention is defined using the binomial distribution as follow:

$$P_{lex}(E_k, C_k) = B(r; n, p),$$

Where n=# instances of finding lexicon words in $E_k$;

r=# instances of finding expected translation (listed in the lexicon) in $C_k$; and p=average rate of finding a lexicon match for each of words.

In conclusion, the final probability module used in the present invention can be defined as follow:

$$P(A \mid E, C) = \prod_{k=1}^{t} P(\delta_k \mid match_k) P(match_k) P_{pun}(E_{ik}, C_{jk}) P_{lex}(E_{ik}, C_{jk}).$$

The above probability modules dynamically calculate the length score, the match type score and punctuation score. These scores are then used to adjust the text alignment to obtain a best result, as shown at step 28 of FIG. 2.

To facilitate understanding, the followings are exemplary alignment results that are performed by the text alignment system and method of the present invention.

Example I

[Negative wage growth is no new phenomenon].
在/一九八八/年 長/的/情況/並非/今/時/今/日才/出現〕，
Scores:
Length Score
Probability of 7 English words corresponding to 11 Chinese words
Match type score
Probability of 1 sentence for 1 sentence
Punctuation score
Probability of [.] corresponding [,]
+no deletion score Example II

[Even when the economy is blooming], [the workers are unable to share the fruit of economic success].
〔縱使/經濟/前景/良好〕，〔勞工/也/無從/分享/經濟/成果〕。
Scores:
Length Score
Probability of 7 English words corresponding to 11 Chinese words
Match type score
Probability of 1 sentence for 1 sentence Punctuation score
Probability of [.] corresponding [○]
+deletion score of [,] and [,].

As described above, the text alignment in accordance with the present invention can only utilize punctuations as a basis to align a pair of texts. To increase its accuracy, it can also combine length-based and/or dictionaries for text alignment. It is optional, however, for the text alignment of the present invention to rely on dictionaries to increase alignment efficiency because by solely utilizing length-based and punctuation-based alignments, the accuracy of the present invention can be as high as 90% and up. Furthermore, the text alignment in accordance with the present invention can be used in text-aligning different languages other than Chinese and English, such as Japanese and English, Chinese and French, Chinese and Germany, and so on.

Experiments have been performed based on the method of the present invention. Using the source data from the official record of proceedings of Hong Kong Legislative Council from Nov. 2, 1995 to Nov. 11, 1997, a total of 100 paragraphs were randomly selected as training data, and trained for match type probability, mean, variance, and punctuation match/deletion probability. The probability p in binominal distribution is very high, p=0.8/0.9.

Furthermore, the granularity of the method of the prevent invention, as compared to the prior art methods, is increased 50%. The method of the present invention is applicable in computer-assisted learning and computer-assisted translation wherein the effort by a reader is reduced by 50%, which equals to 100% increase in productivity because what is read by the reader is reduced.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A computer-implemented method of aligning text from a first document with text from a second document, wherein the text from the second document is a translation of the text from the first document, the method comprising:

reading into computer memory a first text from the first document and a second text from the second document, wherein the first text and the second text each include at least one paragraph;

performing, by a processor, the operations of:

divliding the first text and the second text into sub-sentential segments, wherein the sub-sentential segments are delimited by punctuation;

calculating lengths of one or more sub-sentential segments;

combining one or more sub-sentential segments having lengths less than a predetermined minimum length with one or more other sub-sentential segments;

generating pairs of alignment units from the first text and the second text, each alignment unit including at least one sub-sentential segment;

pre-processing a portion of the pairs of alignment units to generate reference components;

scoring remaining ones of the pairs of alignment units according to the reference components to generate a scored result for each alignment unit; and aligning the pairs of alignment units based on the scored results.

2. The method of claim 1, wherein pre-processing a portion of the pairs of alignment units to generate reference components further comprises:

outputting the portion of pairs of alignment units;

receiving training information representing errors associated with the alignment units and corrections of the errors;

analyzing the training information to generate reference components; and feeding back the generated reference components for use in subsequent aligning and scoring.

3. The method of claim 1, further comprising:

comparing the length of each sub-sentential segment to the predetermined minimum length; and combining each sub-sentential segment having a length less than the predetermined minimum length with one or more other sub-sentential segments.

4. The method of claim 3, further comprising combining each sub-sentential segment having a length less than the predetermined minimum length with an adjacent sub-sentential segment.

5. The method of claim 3, wherein the processor determines whether to combine a first sub-sentential segment having a length less than the predetermined minimum length with a second, subsequent adjacent sub-sentential segment depending on the punctuation associated with the first sub-sentential segment.

6. The method of claim 1, wherein scoring remaining ones of the pairs of alignment units further comprises:

calculating a probability of corresponding punctuations between the pairs of alignment units.

7. The method of claim 6, wherein scoring remaining ones of the pairs of alignment units further comprises:

calculating at least one probability of corresponding length and match type between the pairs of the alignment units.

8. The process of claim 1, wherein generating the reference components further comprises:

obtaining at least one of sentential length expectation values of sentences of the first and second documents, variants, punctuation correspondence probability, deletion probability, and match type probability.

9. The process of claim 1, wherein scoring remaining ones of the pairs of alignment units further comprises:

calculating a probability of a pair of alignment units, wherein the probability is calculated based on the following equation:

$$P(A|E,C) = P(l_1^t|E,C) = \prod_{k=1}^{t} P(l_k|E,C)$$

in which E is an English paragraph, C is a Chinese paragraph, and/represents a linking manner of all sub-sentential segments included in the pair of alignment unit.

10. The process of claim 9, wherein calculating the probability of a pair of alignment units further comprises:

calculating the linking manner l based on the following equation:

$$P_{pun}(e_i,c_j) = P_{match}(P_{ei},P_{cj})P_{del}(P_{ei})P_{del}(P_{cj}), \text{ for some } l_k=(e_i,c_j)$$

in which $e_i$ and $c_j$ have, one, or many punctuations $e_i$, $c_j$=English and Chinese text-alignment units;

$p_{ei}$=the English punctuations of $e_i$, i=1, m;

$p_{cj}$=the Chinese punctuations of $c_j$, j=1, n;

$P_{match}(P_{ei}, P_{cj})$=probability of ending punctuation of $e_i$ translates into ending punctuation of $c_j$;

$P_{del}(P_{ei})$=probability of punctuations of $e_i$ (not contain ending punctuation) to be deleted; and $P_{del}(P_{cj})$=probability of punctuations in $c_j$ (not contain ending punctuation) to be deleted.

11. The process of claim 9, wherein scoring the remaining pairs of alignment units further comprises:

calculating a probability of a corresponding length based on the following equation:

$P(E,C)$=Prob($\delta$|match)Prob(match), in which Prob($\delta$|match)=2(1−Prob(|$\delta$|)), $$Prob(\delta) = \frac{1}{\sqrt{2\pi}} \int_{-\infty}^{\delta} e^{-z^2/2} dz,$$

and Prob(match) is the probability of match type of the sub-sentential segments included in the pair of alignment units.

12. The process of claim 11, wherein scoring the remaining pairs of alignment units further comprises:

calculating the probability of match type of sub-sentential segments having lengths less than the predetermined minimum length, the probability of match type being calculated based on the following equation:

$$P(A|E,C) = \prod_{k=1}^{t} P(l_k|E,C) = \prod_{k=1}^{t} P(\delta_k|match_k)P(match_k)P_{pun}(e_{ik},c_{jk}).$$

13. The process of claim 12, wherein scoring the remaining pairs of alignment units further comprises:

calculating lexical information probability of the pairs of alignment units based on the following equation:

$P_{lex}(E_k,C_k)=B(r;n,p)$ in which n=# instances of finding lexicon words in $E_k$;

r=# instances of finding expected translation (listed in the lexicon) in $C_k$; and p=average rate of finding a lexicon match for each of words.

14. The process of claim 13, wherein scoring the remaining pairs of alignment units further comprises:
  calculating the probability of a pair of alignment units based on the following probability module:

$$P(A \mid E, C) = \prod_{k=1}^{t} P(\delta_k \mid match_k) P(match_k) P_{pun}(E_{ik}, C_{jk}) P_{lex}(E_{ik}, C_{jk}).$$

15. The method of claim 1, wherein the processor further performs the operation of:
  normalizing one or more of the sub-sentential segments.

16. The method of claim 15, wherein normalizing one or more of the sub-sentential segments includes:
  calculating the lengths of the one or more sub-sentential segments.

17. The method of claim 15, wherein normalizing one or more of the sub-sentential segments includes:
  considering a syntax structure of the one or more sub-sentential segments.

18. A computer system for aligning text from a first document with text from a second document, wherein the text from the second document is a translation of the text from the first document, the system comprising:
  a memory storing a first text from the first document and a second text from the second document;
  a pre-processor configured to:
    divide the first text and the second text into sub-sentential segments, wherein the sub-sentential segments are delimited by punctuation;
    calculate lengths of one or more of the sub-sentential segments;
    combine one or more sub-sentential segments having lengths less than a predetermined minimum length with one or more other sub-sentential segments;
    generate pairs of alignment units from the first text and the second text, each alignment unit including at least one sub-sentential segment; and
    pre-process a portion of the pairs of alignment units to generate reference components; and
  a processor configured to:
    score remaining ones of the pairs of alignment units according to the reference components to generate a scored result for each alignment unit; and
    align the pairs of alignment units based on the scored results.

19. The system of claim 18, wherein the reference components include at least one of sentential length expectation values of sentences of the first text and the second text, variants, punctuation correspondence probability, deletion probability, and match type probability.

* * * * *